United States Patent Office 3,377,239
Patented Apr. 9, 1968

3,377,239
METHOD FOR CONTROLLING OR ERADICATING INSECT PESTS BY CHEMOSTERILIZATION WITH 2-AZOLIN-2'-YL BENZIMIDAZOLES
George Holan, Brighton, Victoria, Australia, assignor to Monsanto Chemicals (Australia) Limited, West Footscray, Victoria, Australia, a company of Australia
No Drawing. Filed Mar. 21, 1966, Ser. No. 535,698
10 Claims. (Cl. 167—33)

ABSTRACT OF THE DISCLOSURE

A chemosterilization method for the control or eradication of insect pests and their larvae by subjecting the pests to the action of a compound of the class of 2-azolin-2'-yl benzimidazoles.

---

This invention relates to methods of controlling or eradicating insect pests and their larvae, such as flies, mosquitoes, moths, beetles, cockroaches, mites, and nematodes the invention providing compositions for the purpose.

Within the past few years a method or technique of controlling or eradicating insects, known as chemosterilization, has been devised, a discussion of this method appearing in a booklet titled "Advances in Chemistry Series 41," pages 36–55, published in 1963 by American Chemical Society, Washington, D.C., U.S.A. In this method, insects or their larvae are brought into contact with a chemical capable of causing sexual sterility, that is, failure of the insects to reproduce, the chemical in consequence being termed a chemosterilant. In the development of this method it has been demonstrated that when a large proportion of the natural population of a colony of insects is rendered sterile, the entire population may thereby be eliminated by failure to reproduce sufficiently.

Chemosterilants should be relatively cheap to produce; effective at a relatively low dose or application rate; nontoxic towards insects or their larvae at the selected dose or application rate; and non-toxic or non-injurious toward mammals and valuable plant-life, if they are to be acceptable for wide-spread use. We have now discovered that compounds which meet these requirements are the 2-azolin-2'-yl benzimidazoles of the structural formula:

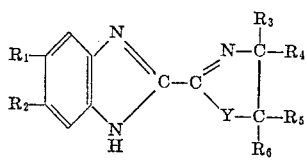

wherein $R_1$ and $R_2$ are selected from hydrogen, halogen, nitro, alkyl containing from 1 to 4 carbon atoms, alkoxy containing from 1 to 4 carbon atoms, and dialkylamino in which each alkyl contains from 1 to 4 carbon atoms; Y is selected from —O—, —S—, and —NH—; and $R_3$, $R_4$, $R_5$ and $R_6$ are selected from hydrogen and alkyl containing from 1 to 4 carbon atoms; and including the acid addition salts of such 2-azolin-2'-yl benzimidazoles in the case where Y is —NH—. In the above-specified compounds, the alkyl or alkoxy groups, or each of the alkyl groups in the dialkylamino group, preferably are methyl; the halogen preferably is chlorine; and the salts preferably are derived from inorganic or organic acids, such as hydrochloric, sulfuric, and acetic.

Representative of the 2-azolin-2'-yl benzimidazole chemosterilants according to the present invention include 2-(2'-imidazolin-2'-yl) benzimidazole; 2-(2'-imidazolin-2'-yl)-5,6-dimethyl-benzimidazole; 2-(2'-imidazolin-2'-yl)-5,6-dichlorobenzimidazole; 2-(2'-imidazolin-2'-yl)-5-chlorobenzimidazole; 2-(2'-imidazolin-2'-yl)-5-methyl-benzimidazole; 2-(4'-methyl-2'-imidazolin-2'-yl)-benzimidazole; 2-(2'-thiazolin-2'-yl)-benzimidazole; 2-2'-thiazolin-2'-yl)-5,6-dimethylbenzimidazole; 2-(2'-thiazolin-2'-yl)-5-methoxybenzimidazole; 2-(2'-thiazolin-2'-yl)-5,6-dichlorobenzimidazole; 2-(2'-oxazolin-2'-yl)-benzimidazole; 2-(2'-oxazolin-2'-yl-5,6-dimethylbenzimidazole; 2-(2'-oxazolin-2'-yl)-5-chlorobenzimidazole; 2-(2'-oxazolin-2'-yl)-5-methoxybenzimidazole; 2-(4'-methyl-2'-oxazolin-2'-yl)-benzimidazole; and 2-(4',4'-dimethyl-2'-oxazolin-2'-yl)-benzimidazole.

Chemosterilant compounds according to the invention are effective when brought into contact with insects or their larvae, desirably through the medium of a bait which preferably is the insects' or larvae's food, although such compounds may also be applied topically such as by spraying or dusting the compounds in conventional forms of spraying or dusting formulations. In the case where the chemosterilant compounds or a mixture of such compounds are applied through a bait, such compound/s may be present in the bait at a concentration of 0.1% to 1% by weight of the bait. The bait may be granulated sugar or granulated sugar mixtures or powdered milk or powdered egg or granulated corn meal or other attractive and digestible compositions, either in solid or liquid form.

Tests were carried out to determine the efficacy of the present chemosterilant compounds against houseflies (*Musca domestica* L.). In these tests, adult flies are given the candidate chemosterilant in granulated sugar and/or regular fly food (consisting of 6 parts of sugar, 6 parts of powdered nonfat dry milk, and 1 part of powdered egg yolk). Fly food or sugar containing 1% of the chemosterilant is prepared by adding 6 ml. of a solution or suspension of the chemical in a volatile solvent to 10 grams of the food. The solvent is allowed to evaporate for 4 to 6 hours, and the dried sugar or fly food is repulverized. The treated diet, with a container of water, is placed in cages containing 100 newly emerged adult flies. Cages of 100 flies, containing untreated fly food or sugar, are used as checks. After 3 days, the flies are examined to note any mortality caused by the chemosterilant, and untreated regular fly food is added to those cages of flies containing treated sugar diet to provide protein for egg development. When the flies are 6 to 7 days old, ½ inch of moist CSMA medium in a souffle cup is placed in the cage for oviposition. Four to six hours later, the souffle cup with the oviposition medium is filled with water and stirred to break up the egg masses. A random sample of 100 eggs is collected and placed on a small piece of wet black cloth, which is laid on the top of moist larval medium in a rearing container. If no eggs are laid, oviposition medium is offered again at intervals of 1 or 2 days until it has been offered five times or the flies have oviposited. After the eggs are exposed on the larval medium for 2 or 3 days, the percent hatch is determined. The larvae that hatch crawl from the cloth into the rearing medium, and about a week after oviposition the pupae are counted to determine the number of larvae that have reached the pupal stage of development. The chemosterilant is first tested at a concentration of 1%. Those chemosterilants that cause sterility or mortality are tested at lower concentrations to find the minimum effective concentration. Normally those that cause sterility are also tested at 2.5% and 5% to determine whether these concentrations could be used without causing high mortality.

2-(2'-imidazolin-2'-yl)-benzimidazole was tested in fly food as indicated above, in the concentrations set out, below, and the following results obtained:

| | Treated Diet | | | Control (Untreated Diet) | |
|---|---|---|---|---|---|
| Concentration (percent) | Mortality in parent generation | Egg Hatch (percent) | Pupae (number) | Egg Hatch (percent) | Pupae (number) |
| 5.0 | 0 | 0 | 0 | 88 | 80 |
| 2.5 | 0 | 0 | 0 | 88 | 80 |
| 1.0 | 0 | 7 | 5 | 97 | 90 |
| 0.5 | 0 | 4 | 0 | 83 | 73 |
| 0.25 | 0 | 0 | 0 | 83 | 73 |

These results demonstrate that the chemosterilants of the invention are useful in combatting houseflies (*Musca domestica* L.) and would show similar activity against screw-worm flies [*Cochlimiomyia hominivorax* (Coquerel)] and Mexican fruit flies[*Anastrepha ludens* (Loew)].

The 2-azolin-2'-yl benzimidazole cheosterilants according to the present invention may be prepared by the reaction of a trichloromethyl benzimidazole of the structural formula:

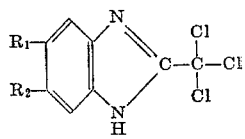

wherein $R_1$ and $R_2$ are as defined above, with an amine of the structural formula $H_2NC(R_3R_4) \cdot C(R_5R_6 \cdot YH)$, wherein $R_3$, $R_4$, $R_5$, $R_6$ and Y are as defined above. The 2-trichloromethyl-benzicidazole invariably reacts with the amine spontaneously, however, it may be necessary to heat the reaction mixture to a temperature in the order of 20–80° C., the reaction preferably being held as low as possible in order to minimize the extent of side reactions. An inert diluent or solvent may be used in carrying out the reaction in order to give a more easily controlled reaction in handling. The amine may be used as the hydrochloride, the free base being generated in situ by addition of a base such as a sodium alkoxide or a tertiary amine. An excess of the amine is prefered since this serves to neutralise the hydrogen chloride formed in the reaction.

Preparation of the 2-azolin-2'-yl benzimidazole chemosterilants as indicated above is illustrated in the following non-limitative practical examples:

Example 1

Ethylene diamine (9 ml. 0.15 mole) was added gradually with cooling to a solution of 2-trichloromethylbenzimidazole (4.8 g., 0.02 mole) in 1,2-dimethoxyethane After 15 minutes, the solution was diluted with water giving 2-2'-imidazolin-2'-yl)-benzimidazole as a pale buff solid (93% yield). Recrystallisation from aqueous acetone gave colourless needles, M.P. 280° C.

Analysis of the product resulted: Found: C, 64.7; H, 5.6; N, 29.7 $C_{10}H_{10}N_4$. Requires: C,64.5; H, 5.4; N, 30.1%.

Example 2

Propylene diamine (4.2 g. 0.05 mole) was added gradually to a hot solution of 2-trichloromethylbenzimidazole (4.8 g. 0.02 mole) in 1,2-dimethoxyethane (50 ml. An exothermic reaction developed and the reaction mixture boiled. The mixture was allowed to cool to room temperature over one hour, then solids were filtered off. The solid consisted of propylene diamine hydrochloride together with some of the required product (0.8 g.), which was separated from the hydrochloride by washing with water. Dilution of the reaction mother liquor with petroleum ether gave a further amount (1.2 g.) of the required product. The combined product was recrystallised from chloroform and from ethyl acetate giving 2-(4'-methyl-2'-imidazolin-2'-yl)-benzimidazole as colourless crystals, M.P. 252° C.

Example 3

Ethylene diamine (0.6 g., 0.01 mole) was added gradually to a hot solution of 5(6)-chloro-2-trichloromethylbenzimidazole (1.4 g., 0.005 mole) in alcohol. The mixture was allowed to stand for a few hours after the addition was completed. The precipitated ethylene diamine hydrochloride was filtered off, the alcoholic solution was diluted with water to give some unclean product. Addition of 10% sodium carbonate solution precipitated 2-(2'-imidazolin-2'-yl)-5(6) chlorobenzimidazole as white crystals (50% yield). Recrystallisation from acetonitrile give colourless needles, M.P. 245° C.

Analysis of the product resulted: Found: C, 54.0; H, 4.1; N, 25.3 $C_{10}H_9N_4Cl$. Requires: C, 54.4; H, 4.1; N, 25.4%.

Example 4

Ethanolamine (4 g., 0.066 mole) was added to a hot solution of 2-trichloromethylbenzimidazole (4.8 g., 0.02 mole) in 1,2-dimethoxymethane. An immediate reaction occurred and solid was precipitated. The reaction mixture was allowed to cool to room temperature over 2 hours, then the solid was filtered off and washed with water giving 2-(2'-oxazolin-2'-yl)-benzimidazole in 64% yield. Recrystallisation from methanol gave colourless prisms, M.P. 268° C.

Analysis of the product resulted: Found: C, 64.4; H, 5.2; N, 22.8% $C_{10}H_9N_3O$. Requires: C, 64.2; H, 4.9; N, 22.5%.

Example 5

2-mercaptoethylamine hydrochloride (1.1 g.) was added to a solution of sodium (0.92 g.) in ethanol. 2-trichloromethylbenzimidazole (2.3 g.) was added to this solution at room temperature when an exothermic reaction set in. The product was collected after 1 hour, washed with water, and recrystallised from ethanol to give 2-(2'-thiazolin-2'-yl)-benzimidazole as plates, M.P. 292–294° C. (*d*).

Found: C, 59.1; H, 4.5; N, 20.2; S, 16.2; $C_{10}H_9N_3S$. Requires: C, 59,1; H, 4.5; N, 20.7; S, 15.8%.

I claim:
1. A method of combatting insect pests and their larvae, which comprises subjecting them to the action of a chemosterilant amount of at least one 2-azolin-2'-yl benzimidazole having the structural formula:

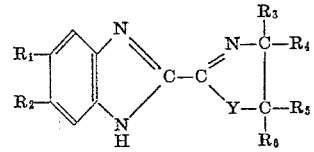

wherein $R_1$ and $R_2$ are each selected from the group consisting of hydrogen, halogen, alkyl of not more than 4 carbon atoms and alkoxy of not more than 4 carbon atoms; Y is selected from the group consisting of —O—, —S—, and —NH—; $R_3$, $R_4$, $R_5$ and $R_6$ are each selected from the group consisting of hydrogen and alkyl of not more than 4 carbon atoms; and the acid addition salts of such 2-azolin-2'-yl benzimidazoles in the case where Y is —NH—.

2. A method according to claim 1 wherein the halogen is chlorine.

3. A method according to claim 1 wherein the alkyl is methyl.

4. A method according to claim 1 wherein the alkoxy is methoxy.

5. A method according to claim 1 wherein the pests are subjected to the action of the chemosterilant amount of 2-(2'-imidazolin-2'-yl)-benzimidazole.

6. A method according to claim 1 wherein the pests are subjected to the action of a chemosterilant amount of 2-(2'-imidazolin-2'-yl)-5,6-dimethylbenzimidazole.

7. A method according to claim 1 wherein the pests are subjected to the action of a chemosterilant amount of 2-(2'-thiazolin-2'-yl)-benzimidazole.

8. A method according to claim 1 wherein the pests are subjected to the action of a chemosterilant amount of 2-(2'-thiazolin-2'-yl)-5,6-dimethylbenzimidazole.

9. A method according to claim 1 wherein the pests are subjected to the action of a chemosterilant amount of 2-(2'-oxazolin-2'-yl)-benzimidazole.

10. A method according to claim 1 wherein the pests are subjected to the action of a chemosterilant amount of 2-(2'-oxazolin-2'-yl)-5,6-dimethylbenzimidazole.

References Cited

UNITED STATES PATENTS 3,180,792   4/1965   Woods _____ 107—135

ALBERT T. MEYERS, *Primary Examiner.*

S. FRIEDMAN, *Assistant Examiner.*